Figure 1:
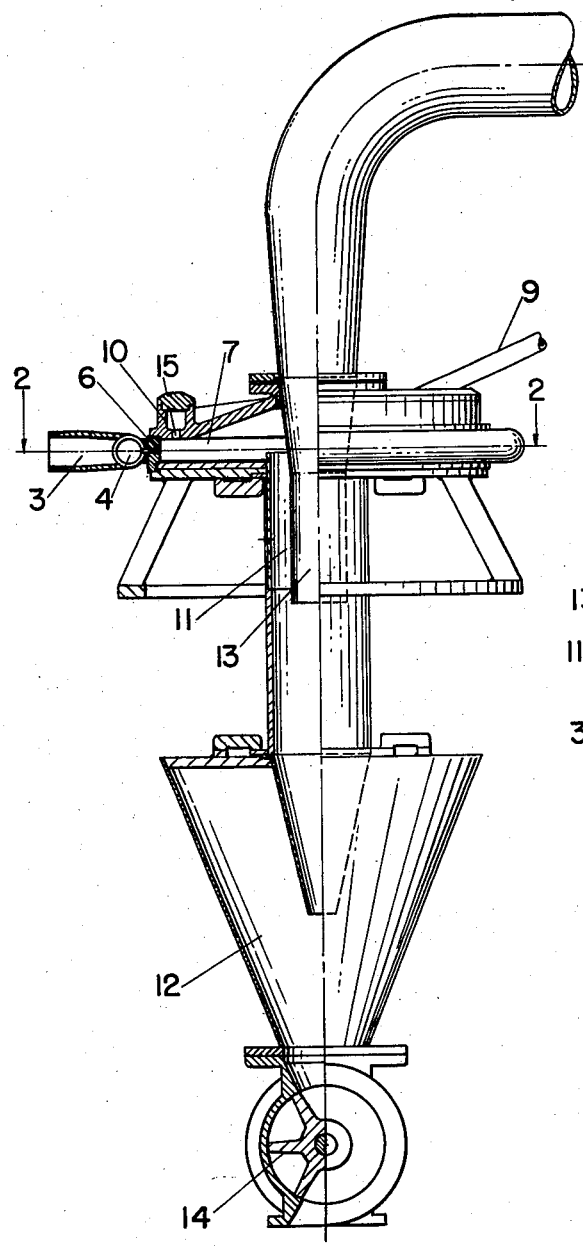

Oct. 14, 1958     L. O. YOUNG     2,856,268
METHOD OF PREPARING LOW DENSITY GELS
Filed May 27, 1954

INVENTOR.
LUTHER O. YOUNG
BY Kenneth E. Prince

United States Patent Office 2,856,268
Patented Oct. 14, 1958

2,856,268

METHOD OF PREPARING LOW DENSITY GELS

Luther O. Young, Baltimore, Md., assignor to W. R. Grace & Co., New York, N. Y., a corporation of Connecticut Application May 27, 1954, Serial No. 432,885

6 Claims. (Cl. 23—182)

This invention relates to finely divided gels and to an improved method of preparing them. More particularly the invention relates to a method of preparing finely divided low-density, hydrous oxide gels suitable for use as paint, varnish and plastic fillers and extenders.

Hydrous oxide gels, such as silica gel, are extensively used in a finely divided state to reduce light reflections from otherwise glossy surfaces, to impart certain wear resistant properties to elastic materials, and as an inert filler for other materials. They are used extensively as flatting agents in photographic emulsions, printing inks, lacquers and varnishes. The finely divided gels of the present invention are especially adapted for use as flatting agents.

For many applications, it is desirable that the hydrous oxide, in addition to being very finely divided, have a very low bulk density. This is especially desirable when the material is to be used as a constituent of varnish or paint formulation, since a low density material is less apt to settle out than high density material. In general, it can be said that these finely divided hydrous oxide gels should have low density, fine particle size and low moisture content. A high moisture content would render the material less compatible with the organic solvents or liquids employed in varnishes and lacquers.

In the manufacture of hydrous oxide gels, such as silica gel, a reaction is generally carried out between a gelforming constituent, such as sodium silicate, and a reagent, such as sulphuric acid, capable of reacting with the gel-forming constituent to form a hydrosol of the hydrous oxide. The hydrosol is allowed to set to a hydrogel and the latter is broken into pieces, washed and dried to produce a hard, stable, granular product. The dried material may be ground by various known means to provide the finely-divided material useful as fillers and extenders for paints, varnishes, plastics, etc.

Methods of controlling the density of the final product to some degree are known. In one method, a low density gel product is obtained by controlling the temperature of the wash liquid. Using a hot wash liquid yields a product of comparatively low density. However, the degree of control by this method is limited. In another method, the gel is washed with heated water to which ammonia has been added. By varying the amount of ammonia used and adjusting the temperature of the water, the density of the final product may be controlled to a somewhat greater degree than is possible by use of temperature control alone. In still another method, the hydrogel is slowly heated in an autoclave in the presence of water to about 325° F. and then slowly cooled by allowing the water to evaporate. The heating is continued until the water content has been reduced to about 5% to 15%.

In each of these methods, there is ultimately produced a product having a lower than normal density. However, the normal method for removal of water is a slow drying process carried out in various commercial dryers. During the drying process the gel structure shrinks and densifies somewhat so that some of the advantages gained in reducing the density in the steps preceding the drying operation are lost.

When a particle size in the 3–10 micron range is desired, it is necessary to grind the dried material in a separate operation. In neither the drying nor the grinding step can there be expected any reduction in the density of the material. On the contrary, the drying of hydrogels usually results in an increase in the density.

By the present invention, it has now been discovered that a low density, finely divided, friable oxide gel can be prepared by simultaneously drying and comminuting a hydrogel of the appropriate hydrous oxide. Material produced by this method has an unexpectedly lower density than material which is first dried and then ground. Furthermore, the method of the present invention eliminates one step from the normal sequence for preparing finely divided hydrous oxide gels.

It is therefore an object of this invention to provide a method of producing friable, low density, finely divided gels. It is another object of this invention to provide a method of simultaneously drying and comminuting a hydrogel of an inorganic oxide to produce a low-density material. Other objects and advantages of this invention will appear more fully hereinafter.

The present invention consists of providing a moving body of hydrogel particles suspended in a gaseous medium at superatmospheric pressure and at a temperature above the boiling point of water at that pressure, continuously introducing additional hydrous gel into the body, continuously introducing additional heated fluid in a plurality of high velocity streams directed inwardly into said body in a manner to cause extreme turbulence within the mass and a resulting attrition of the suspended particles, and continuously removing the comminuted and dried material from the body along with the fluid and water vapor. The dry particles are separated from the suspending fluid at a temperature above the boiling point of water.

One apparatus suitable for carrying out the present invention is generally referred to as a fluid energy mill. In this equipment, the large particles are suspended in a gaseous medium whirling around in an enclosed space. Additional heated gases are introduced into the whirling body in a manner to cause turbulence within the body and comminution of the particles by attrition.

Figure 2:
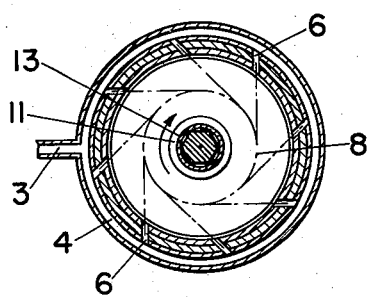

By way of illustration, reference is made to the accompanying drawing in which Fig. 1 is a vertical view, partly in section, of a suitable apparatus by which the present invention is efficiently conducted. Fig. 2 is a section taken on a plane indicated at 2—2 in Fig. 1.

The hydrogel which is treated according to this invention may be prepared in several ways. For instance, a silica hydrogel is usually prepared by mixing a sodium silicate solution with sulfuric acid to form a silica hydrosol and allowing the hydrosol to set to a hydrogel. The hydrogel is broken up, washed with a suitable liquid to remove undesirable impurities and then drained.

In carrying out the present invention in the apparatus shown, a gaseous fluid under superatmospheric pressure and at a temperature above the boiling point of water at that pressure is introduced through fluid inlet 3 into an annular header 4 which is provided in its inner peripheral wall with a plurality of spaced openings 6 which are arranged to discharge the fluid into chamber 7 in a direction tangent to a theoretical circle 8 (Fig.2) concentric with but of smaller diameter than chamber 7. The hydrogel is injected under pressure through feed inlet 9 into annular feed header 10 disposed above chamber 7 adjacent its peripheral edge and communicating therewith by means of spaced ports 15 through which the hydrogel is injected into the chamber 7. The hydrogel particles, which, initially, contain about 60–90% water, are entrained in the rotating fluid and thereby provide a rotating body of gel particles suspended in the gaseous fluid. Additional heated fluid is continuously injected into the rotating body as described and produces extereme turbulence therein. The pulverizing operation of this type of equipment is well known. Under these conditions the particles are subjected to the attrition characteristic of fluid energy mills and simultaneously with the disintegrating action resulting from the flash vaporization of water contained within the hydrogel structure.

The rotative movement of the mass of particles and fluid is maintained sufficiently high so that the larger particles gravitate toward the outer region of the mass while the finer particles move toward the axial outlet or collector 11. As comminution progresses, the smallest particles move to the center of chamber 7 and together with the gaseous fluid are discharged axially therefrom into collector 11. The rotative movement of the fluid continues in the collector 11 so that the force of rotation frees the fluid from the finely divided material by centrifugal action. At this point, the temperature of the gaseous fluid is still above the boiling point of water which maintains the particles in a dry state. The separated particles fall along the wall of the collector 11 and drop into the hopper 12. The freed fluid together with the vaporized water from the hydrogel move upwardly through the outlet 13, disposed concentrically within collector 11, and are exhausted from the system into the atmosphere. A small amount of the smallest particles may be carried out with the exhaust. If desired, this material may be recovered by a suitable secondary dust collector.

As the product is being discharged from the hopper 12, back pressure is prevented by a star valve 14 at the bottom of the hopper 12. The product discharged from the hopper 12 is a dry, finely divided, friable, low density material.

The gaseous medium used in the treatment of appropriate hydrogels may be superheated steam, hot compressed air or any other desirable elastic fluid. In selecting the medium, practical consideration must be given to the material to be treated.

This invention is applicable to the treatment of such inorganic oxides as $SiO_2$, $Al_2O_3$, $MgO$, $ZnO$, and $Fe_2O_3$.

The present invention is further illustrated by the following examples which describe the preparation of a low density silica gel.

EXAMPLE 1

A 32.5° Be. sodium silicate solution was acidified with a 36.0° Be. solution of sulfuric acid. The mixture formed a 17% silica hydrosol which set to a hydrogel in about one hour. The silica hydrogel was broken up and washed with heated water made slightly alkaline with ammonia. The total volatile matter (T. V.) in the hydrogel after washing and draining was about 70%. The hydrogel was fed under steam pressure at a rate of about 360 pounds per hour into an apparatus substantially as described above and shown in the accompanying Fig. 1. Superheated steam was passed into the chamber from the annular header at a pressure of about 140 p. s. i. g. and at a temperature of approximately 900° F.

The finely divided silica gel product collected from the apparatus had an average particle size of about 3 microns and a bulk density of about 0.13 gm./cc. The total water content was approximately 9%.

A number of experiments were conducted according to the present invention which consisted of treating silica hydrogels containing from about 6% to about 17% $SiO_2$ having various moisture contents. Superheated steam varying in temperatures from about 850° F. to about 900° F. and at pressures of about 125 to 150 p. s. i. g. was employed. The resulting products had a final T. V. of about 7.0% to about 9.7% and a bulk density of 0.09 gm./cc. to 0.15 gm./cc. The particle size ranged from 3.4 to about 4.5 microns.

The following table shows the conditions and results for a series of such test runs.

Table 1

| T. V. of Hydrogel | Steam pressure, p. s. i. g. | Steam Temp., ° F. | T. V. of final product, percent | Bulk density of product, gm./cc. |
|---|---|---|---|---|
| 69.0% | 125 | 850 | 9.7 | 0.13 |
| 66.5% | 125 | 870 | 8.3 | 0.15 |
| 62.0% | 130 | 875 | 8.5 | 0.13 |
| 65.5% | 140 | 880 | 7.5 | 0.13 |
| 68.4% | 140 | 880 | 7.8 | 0.12 |
| 62.0% | 140 | 900 | 8.9 | 0.13 |
| 62.0% | 150 | 900 | 7.0 | 0.13 |
| 70.0% | 110 | 860 | 8.8 | 0.09 |

A comparison of the finely divided silica gel prepared according to this invention and commercial finely divided silica gels prepared by first drying the hydrogel and then grinding the dried gel is illustrated in the following example.

EXAMPLE 2

A silica hydrogel as prepared in Example 1 was dried to a T. V. of about 8% and then comminuted in the apparatus described in Example 1. The resulting product had approximately the same particle size as the final product prepared in Example 1. However, the bulk density of the present material was about 0.29 gm./cc., which is over 100% higher than the density (0.13 gms./cc.) of the product prepared according to the present invention. The final T. V. of the material was about 8%.

When drying with steam, the final T. V. of the comminuted hydrous oxides is usually substantially the same as that of material prepared by comminuting preliminarily dried gel. However, it has always been the practice to preliminarily dry the gel before it is comminuted. This drying apparently shrinks the gel which may account for the higher bulk density observed in such material as compared with material of the present invention.

The finely divided silica gels of the present invention may be used in any fields where low density, high bulking value, purity, transparency, and friability are primary requirements. Typical uses are to reduce the gloss of a surface, such as lacquer and varnish flatting agents, as a plastic filler, or reinforcing agent for rubber and rubber-like products, anti-caking agents for insecticides, pharmaceuticals, gelling or thickening agent for inks, cosmetic absorbent, photographic emulsions and similar applications.

I claim:

1. A method of making a low density, finely divided friable silica gel comprising providing a rotating body of fluidized silica hydrogel particles in a gaseous medium at superatmospheric pressure and at a temperature above the boiling point of water, continuously introducing additional hydrogel into said body, continuously introducing additional heated gaseous fluid into said body in a plurality of high velocity streams directed inwardly into said body to produce extreme turbulence within said body whereby said hydrogel particles are simultaneously dried and comminuted to a finely divided state with an attendant appreciable reduction in density of the resulting particles, withdrawing the fluid, water vapor, and suspended dry, comminuted particles from said body and separating the dry particles from the suspending fluid at a temperature above the boiling point of water.

2. A method of manufacturing a low density, finely divided, friable silica gel comprising providing a rotating body of fluidized silica hydrogel particles in steam at superatmospheric pressure and at a temperature above the boiling point of water, continuously introducing additional hydrogel into said rotating body, continuously introducing additional superheated steam into said body in a plurality of high velocity streams directed inwardly into said body tangentially of a theoretical circle of smaller diameter than the diameter of said rotating body to produce extreme turbulence within said body whereby said hydrogel particles are simultaneously dried and comminuted to a finely divided state with an attendant appreciable reduction in density of the resulting particles, withdrawing the steam, water vapor, and suspended dry, comminuted particles from said body axially thereof, and separating the dry particles from the steam at a temperature above the boiling point of water.

3. A method of manufacturing a low density, finely divided, friable silica gel comprising the steps of washing a silica hydrogel with aqueous ammonia, introducing the hydrogel into a confined zone, injecting steam into the zone tangentially therewith to provide a rotating body of fluidized hydrogel particles in steam at superatmospheric pressure and at a boiling point of water, continuously introducing additional hydrogel under steam pressure into said rotating body, continuously injecting additional superheated steam into said body in a plurality of high velocity streams directed inwardly into said body tangentially of a theoretical circle of smaller diameter than the diameter of said rotating body to produce extreme turbulence within said body whereby said hydrogel particles are simultaneously dried and comminuted to a finely divided state with an attendant appreciable reduction in density of the resulting particles, withdrawing the steam, water vapor, and suspended dry, comminuted particles from said body axially thereof, and separating the dry particles from the steam at a temperature above the boiling point of water.

4. A method of manufacturing a finely divided friable silica gel having a bulk density of about 0.13 gm./cc. comprising forming in a confined zone a rotating body of fluidized silica hydrogel particles in steam at a pressure of about 140 p. s. i. g. and at a temperature above the boiling point of water, continuously introducing additional hydrogel into said rotating body, continuously introducing additional superheated steam into said body in a plurality of high velocity streams directed inwardly into said body tangentially of a theoretical circle of smaller diameter than the diameter of said rotating body to produce extreme turbulence within said body whereby said hydrogel particles are simultaneously dried and comminuted to a finely divided state with an attendant appreciable reduction in density of the resulting particles maintaining the rotational speed of said body sufficiently high that coarse particles gravitate toward the outer periphery of said body for further comminution and the fine particles move toward the inner periphery of said body, withdrawing the steam, water vapor, and suspended dry, comminuted particles from said body axially thereof and separating the dry particles from the suspending steam at a temperature above the boiling point of water and collecting the separated particles.

5. A method of manufacturing a finely divided, friable silica gel having a bulk density of about 0.13 gm./cc. comprising forming a rotating body of fluidized silica hydrogel particles having a moisture content of about 60% to about 90% in steam a confined zone in the presence of at a pressure of about 140 p. s. i. g. and a temperature of about 900° F., continuously introducing additional hydrogel into said rotating body, continuously introducing additional superheated steam into said body in a plurality of high velocity streams directed inwardly into said body tangentially of a theoretical circle of smaller diameter than the diameter of said rotating body to produce extreme turbulence within said body whereby said hydrogel particles are simultaneously dried and comminuted to a finely divided state with an attendant appreciable reduction in density of the resulting particles maintaining the rotational speed of said body sufficiently high that coarse particles gravitate toward the outer periphery of said body and the fine particles move toward the inner periphery of said body, withdrawing the steam, water vapor, and suspended dry, finely divided particles from said body axially thereof, separating the dry particles from the steam at a temperature above the boiling point of water, said particles being dried to a final moisture content of about 8%, and collecting the separated particles.

6. A method of manufacturing a finely divided, friable silica gel having a bulk density of about 0.09 to about 0.15 gm./cc. and a particle size of less than 10 microns comprising forming a rotating body of fluidized silica hydrogel particles having a moisture content of about 60% to about 90% in a confined zone in the presence of steam at a pressure of about 125 to about 150 p. s. i. g. and at a temperature of about 850° F. to about 900° F., continuously injecting additional hydrogel with steam under pressure at a substantially uniform rate into said rotating body, continuously introducing superheated steam into said body in a plurality of high velocity streams directed inwardly into said body tangent to a theoretical circle of smaller diameter than the diameter of said rotating body to produce extreme turbulence within said body whereby said hydrogel particles are simultaneously dried and comminuted to a finely divided state with an appreciable reduction in density of the resulting particles, maintaining the rotational speed of said body sufficiently high that coarse particles gravitate toward the outer periphery of said body and the particles having a size of less than 10 microns move toward the inner periphery of said body, withdrawing the steam, water vapor, and suspended dry, particles from said body axially thereof, separating the dry particles from the steam at a temperature above the boiling point of water, said particles being dried to a final moisture content of about 8%, venting the spent stream from the system, and collecting the finely divided separated particles.

References Cited in the file of this patent

UNITED STATES PATENTS

| | | |
|---|---|---|
| 2,032,827 | Andrews | Mar. 3, 1936 |
| 2,191,095 | Hobbie | Feb. 20, 1940 |
| 2,257,907 | Griswold | Oct. 7, 1941 |
| 2,358,202 | Behrman | Sept. 12, 1944 |
| 2,395,632 | Litty | Feb. 26, 1946 |
| 2,397,350 | Hayden et al. | Mar. 26, 1946 |
| 2,493,218 | Bergstrom | Jan. 3, 1950 |

FOREIGN PATENTS

| | | |
|---|---|---|
| 586,945 | Great Britain | Apr. 8, 1947 |

UNITED STATES PATENT OFFICE
CERTIFICATE OF CORRECTION

Patent No. 2,856,268

October 14, 1958

Luther O. Young

It is hereby certified that error appears in the printed specification of the above numbered patent requiring correction and that the said Letters Patent should read as corrected below.

Column 5, lines 62 and 63, strike out "a confined zone in the presence of", and insert the same before "steam", in line 62, same column.

Signed and sealed this 6th day of January 1959.

(SEAL)
Attest:
KARL H. AXLINE
Attesting Officer

ROBERT C. WATSON
Commissioner of Patents